(12) United States Patent
Kohanski et al.

(10) Patent No.: US 12,460,649 B2
(45) Date of Patent: Nov. 4, 2025

(54) ROTORS FOR USE IN CAUSTIC ENVIRONMENTS (71) Applicant: Vapotherm, Inc., Exeter, NH (US)

(72) Inventors: Jonathan Kohanski, Exeter, NH (US); Jesse Bodwell, Exeter, NH (US)

(73) Assignee: VAPOTHERM, INC., Exeter, NH (US)

( * ) Notice: Subject to any disclaimer, the term of this patent is extended or adjusted under 35 U.S.C. 154(b) by 456 days.

(21) Appl. No.: 16/804,280

(22) Filed: Feb. 28, 2020

(65) Prior Publication Data
US 2020/0276403 A1 Sep. 3, 2020

Related U.S. Application Data (60) Provisional application No. 62/812,939, filed on Mar. 1, 2019.

(51) Int. Cl.
*F04D 13/06* (2006.01)
*A61M 16/00* (2006.01)
(Continued)

(52) U.S. Cl.
CPC ..... *F04D 13/0606* (2013.01); *A61M 16/0066* (2013.01); *F04D 29/026* (2013.01);
(Continued)

(58) Field of Classification Search
CPC ............... F04D 13/0606; F04D 29/026; F04D 29/2266; F04D 29/628; F04D 7/06;
(Continued)

(56) References Cited

U.S. PATENT DOCUMENTS 4,890,980 A * 1/1990 Heald ................. F04D 29/2277
416/183
2003/0222527 A1 12/2003 Laing et al.
(Continued)

FOREIGN PATENT DOCUMENTS

DE 202009017996 U1 * 12/2010 ......... F04D 13/0626
DE 102015210705 12/2016
(Continued)

OTHER PUBLICATIONS

International Search Report and Written Opinion dated May 27, 2020, Application No. PCT/US2020/020267 (14 pages).
(Continued)

*Primary Examiner* — Courtney D Heinle
*Assistant Examiner* — Eric A Lange
(74) *Attorney, Agent, or Firm* — McDermott Will & Schulte LLP (57) ABSTRACT There is provided a rotatable impeller assembly for pumping caustic fluid byproducts in a medical device. The assembly comprises a rotor having a rotor cup, and an impeller having a rotor contacting surface and impeller blades. The assembly further comprises a magnetic ring seated within the cup. The magnetic ring comprises a first contact surface that is configured to mate with an inner surface of the cup, and a second contact surface that is configured to mate with the rotor contacting surface of the impeller. In such an arrangement, the magnetic ring is locked in position by the rotor cup and the impeller, thereby preventing any independent rotation of the magnetic ring relative to the rotor and the impeller while automatically balancing the rotor. Further, the rotor contacting surface of the impeller is attached to the cup to hermetically seal the magnetic ring within the impeller assembly.

16 Claims, 5 Drawing Sheets (51) Int. Cl.
| | | |
|---|---|---|
| *F04D 7/06* | (2006.01) | |
| *F04D 29/02* | (2006.01) | |
| *F04D 29/22* | (2006.01) | |
| *F04D 29/62* | (2006.01) | |
| *H02K 1/2791* | (2022.01) | |

(52) U.S. Cl.
CPC ....... *F04D 29/2266* (2013.01); *F04D 29/628* (2013.01); *H02K 1/2791* (2022.01); *A61M 2230/40* (2013.01); *F04D 7/06* (2013.01)

(58) Field of Classification Search
CPC ............ F04D 29/2227; F04D 29/2294; A61M 16/0066; A61M 2230/40; A61M 2205/0238; A61M 2205/025; A61M 2207/00; H02K 1/2786; H02K 7/14
See application file for complete search history.

(56) References Cited

U.S. PATENT DOCUMENTS

| | | | |
|---|---|---|---|
| 2004/0047753 A1 | 3/2004 | Horvath et al. | |
| 2005/0013699 A1* | 1/2005 | Klein | H02K 7/14 |
| | | | 417/53 |
| 2006/0285985 A1 | 12/2006 | Laing et al. | |
| 2011/0025159 A1* | 2/2011 | Wade | H02K 5/128 |
| | | | 310/156.28 |
| 2012/0049663 A1* | 3/2012 | Mishra | H02K 15/03 |
| | | | 29/598 |
| 2012/0067347 A1* | 3/2012 | Bothma | F04D 29/083 |
| | | | 128/204.17 |
| 2018/0104436 A1 | 4/2018 | Leonard et al. | |
| 2018/0169361 A1* | 6/2018 | Dennis | A61M 16/208 |
| 2018/0233976 A1 | 8/2018 | Kuratani et al. | |

FOREIGN PATENT DOCUMENTS

| | | | | |
|---|---|---|---|---|
| EP | 3176438 A1 * | 6/2017 | ......... | F04D 13/0626 |
| WO | WO-2016198051 A1 * | 12/2016 | ......... | F04D 13/0606 |
| WO | WO-20160198051 | 12/2016 | | |

OTHER PUBLICATIONS

Doshi et al., "High-Velocity Nasal Insufflation in the Treatment of Respiratory Failure: A Randomized Clinical Trial", Annals of Emergency Medicine, Jul. 2017;72(1):73-83.

Spivey S., et al., "Assessment of High Flow Nasal Cannula Therapy use in the Emergency Department Setting: Observations of Practice Across Four Systems", Respiratory Therapy, vol. 10, No. 1, pp. 30-34 (2015).

* cited by examiner

ROTORS FOR USE IN CAUSTIC ENVIRONMENTS

CROSS-REFERENCE TO RELATED APPLICATIONS

This application claims priority to U.S. provisional application No. 62/812,939, filed Mar. 1, 2019, the contents of which are hereby incorporated herein by reference in their entirety.

BACKGROUND

Operation of respiratory therapy systems such as positive airway pressure (PAP) devices, ventilators and other such systems, often require impellers operating at high rotational speeds in caustic environments. Such caustic environments may include corrosive fluids (e.g. ferrous material debris suspended in fluid a humidifier). Traditional impellers operating at high rotational speeds require balancing to ensure quiet operation and longevity of the components due to non-uniform forces caused by an unbalanced impeller. Balancing an impeller is a time consuming process that increases the manufacturing cost of an impeller. Furthermore, secondary assembly operations necessary in balanced systems significantly increase manufacturing costs of impeller assemblies due to the continual skilled handling needed to join and balance components. These secondary assembly operations are a source of assembly error and lead to a higher likelihood of failure due to inevitable human error.

Additionally, corrosive fluids in such caustic environments are destructive to metals or materials used to seal magnets within an impeller assembly. Such corrosive fluids may be present within respiratory therapy systems. Such fluids may prevent the operation of a wide range of rotor and impeller assemblies in respiratory therapy systems due to the corrosive effects and wear on components in continuous operation.

SUMMARY

Disclosed herein are approaches for addressing various of the problems and shortcomings of the state of the art, as identified above. More particularly, disclosed herein are assemblies and methods for providing a rotatable impeller assembly for pumping caustic fluids in a medical device. In the devices and methods described herein provide an impeller assembly with a sealed magnetic ring and physically locked structural components that prevent rotation of the magnetic ring. In the devices and methods described herein, an impeller magnet is sealed from external environments and corrosive fluids, the structural components of the assembly are locked in place, and the rotor is automatically balanced. The devices and methods described herein thus eliminate the need for periodic centering and balancing of the rotor, resulting in a streamlined manufacture and robust assembly, while providing for a more versatile rotor capable of being run in a broad range of fluids.

In one embodiment, there is provided a rotatable impeller assembly for pumping caustic fluid byproducts in a medical device. The assembly comprises a rotor comprising a rotor cup. The assembly also comprises an impeller having a rotor contacting surface and impeller blades. Additionally, the assembly comprises a magnetic ring seated within the rotor cup, the magnetic ring comprising a first contact surface that is configured to mate with an inner surface of the rotor cup, and a second contact surface that is configured to mate with the rotor contacting surface of the impeller, the magnetic ring thereby being locked in position by the inner surface of the rotor cup and the rotor contacting surface of the impeller so as to prevent any independent rotation of the magnetic ring relative to the rotor cup and the impeller while automatically balancing the rotor. Further, the rotor contacting surface of the impeller is attached to the rotor cup to hermetically seal the magnetic ring within the impeller assembly.

In another embodiment, there is provided a method of manufacturing an impeller assembly for pumping caustic fluid byproducts in a medical device, the impeller assembly comprising a rotor and an impeller. The method comprises providing a rotor cup and positioning an impeller onto the rotor cup, the impeller having a rotor contacting surface and impeller blades. The method then comprises seating a magnetic ring within the rotor cup, the magnetic ring comprising a first contact surface that is configured to mate with an inner surface of the rotor cup, and a second contact surface that is configured to mate with the rotor contacting surface of the impeller. Further, the method comprises locking the magnetic ring between the inner surface of the rotor cup and the rotor contacting surface of the impeller so as to prevent any independent rotation of the magnetic ring relative to the rotor cup and the impeller while automatically balancing the rotor. The method also comprises forming a seal between the impeller and the rotor cup thereby sealing the magnetic ring within the impeller assembly.

In certain implementations, the inner surface of the rotor cup comprises a continuous ridge that mates with a corresponding groove formed in the first contact surface of the magnetic ring, thereby locking the magnetic ring in a fixed position relative to the rotor cup. In some implementations, the continuous ridge comprises an O-ring. In other implementations, the magnetic ring comprises anti-rotation features to prevent the independent rotation of the magnetic ring relative to the rotor cup and the impeller. In certain implementations, the rotor contacting surface of the impeller comprises a tapered surface having at least one angle that complements at least one angle formed on the second contact surface of the magnetic ring, thereby locking the magnetic ring in a fixed position relative to the impeller. In some implementations, the impeller assembly is automatically centered and balanced once the magnetic ring is locked in a fixed position.

In other implementations, the hermetic seal locks the rotor, magnetic ring and impeller in position within the impeller assembly to prevent any independent rotation. In some implementations, the magnetic ring is formed by injection molding a slurry of plastic and magnetic material. In certain implementations, the rotor contacting surface of the impeller is attached to the rotor cup by spin welding or ultrasonic welding. In other implementations, the impeller is formed by overmolding a polymer material onto the rotor cup with the magnetic ring seated therein, the overmolding hermetically sealing the magnetic ring between the rotor cup and the impeller. In some implementations, wherein the impeller and rotor cup comprise polyphenylene sulfide (PPS). In certain implementations, the magnetic ring comprises neodymium.

In other implementations, the medical device comprises a respiratory therapy device. In some implementations, the respiratory therapy device is configured to deliver high velocity respiratory fluid to a patient.

Numerous examples are available for adapting and implementing the assemblies and methods described herein. For example, respiratory therapy devices may include Assist/

Control Ventilation, Intermittent Mandatory Ventilation, Pressure Support Ventilation, Continuous Positive Airway Pressure (CPAP) treatment, Non-Invasive Positive Pressure Ventilation (NIPPV), and Variable Positive Airway Pressure (VPAP). The therapy is used for treatment of various respiratory conditions including Sleep Disordered Breathing (SDB) and Obstructive Sleep Apnea (OSA). However, the rotors described herein may be used in other applications such as vacuum applications (medical or otherwise), heart pumps, and irrigation systems, for example.

Variations and modifications will occur to those of skill in the art after reviewing this disclosure. The disclosed features may be implemented, in any combination and subcombination (including multiple dependent combinations and subcombinations), with one or more other features described herein. The various features described or illustrated above, including any components thereof, may be combined or integrated in other systems. Moreover, certain features may be omitted or not implemented.

BRIEF DESCRIPTION OF THE DRAWINGS

The foregoing and other objects and advantages will be apparent upon consideration of the following detailed description, taken in conjunction with the accompanying drawings, in which like reference characters refer to like parts throughout, and in which.

DETAILED DESCRIPTION

To provide an overall understanding of the assemblies and methods described herein, certain illustrative implementations will be described. Although the implementations and features described herein are specifically described for pumping caustic fluid byproducts in a medical device, it will be understood that all the components and other features outlined below may be combined with one another in any suitable manner and may be adapted and applied to respiratory therapy devices, including low flow oxygen therapy, continuous positive airway pressure therapy (CPAP), mechanical ventilation, oxygen masks, Venturi masks, and Tracheostomy masks. Furthermore, it should be noted that while certain implementations are discussed herein within regards to manufacturing impeller assemblies, these various implementations may be used in various combinations to create respiratory therapy systems or other pumps.

Figure 1A:
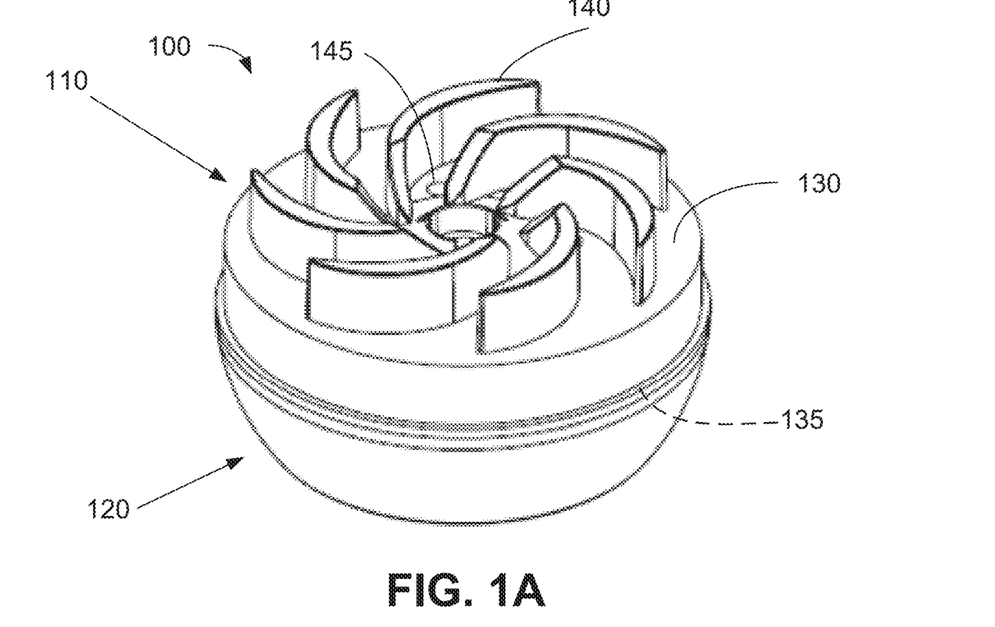
FIG. 1A shows an illustrative balanced rotatable impeller assembly for pumping caustic fluids in a medical device, according to an embodiment of the present disclosure.
Figure 1B:
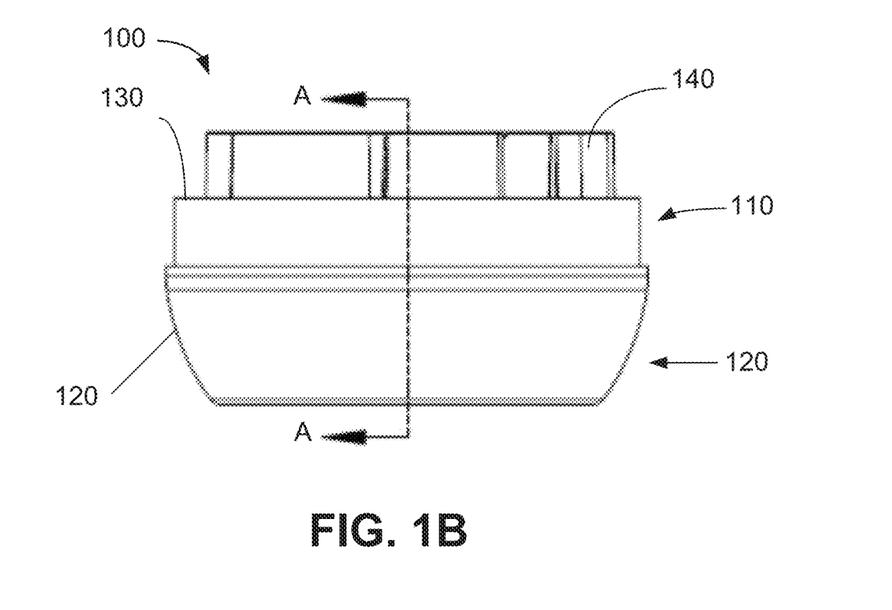
FIG. 1B shows an illustrative side-view of the rotatable impeller assembly of FIG. 1A.

FIG. 1A shows a impeller assembly 100 according to an embodiment of the present disclosure. FIG. 1B shows a side view of the impeller assembly 100. Impeller assembly 100 comprises an impeller 110 and a rotor 120. Impeller 100 comprises a fluid facing surface 130 on which impeller blades 140 are formed. Impeller 110 may be coupled to the rotor 120 at a rotor contacting surface 135. Impeller assembly 100 is rotatable about a central axis (not shown) that is perpendicularly orientated with respect to the surface 130 of the impeller 110 and runs through the entire assembly 100. While the impeller 110 is illustrated as having radially symmetric blades 140, any configuration of blades may be used within the scope of the present disclosure. Impeller 110 may also comprise holes 145 that extend straight through the assembly 100 for additional stability and balance during rotation.

Figure 2:
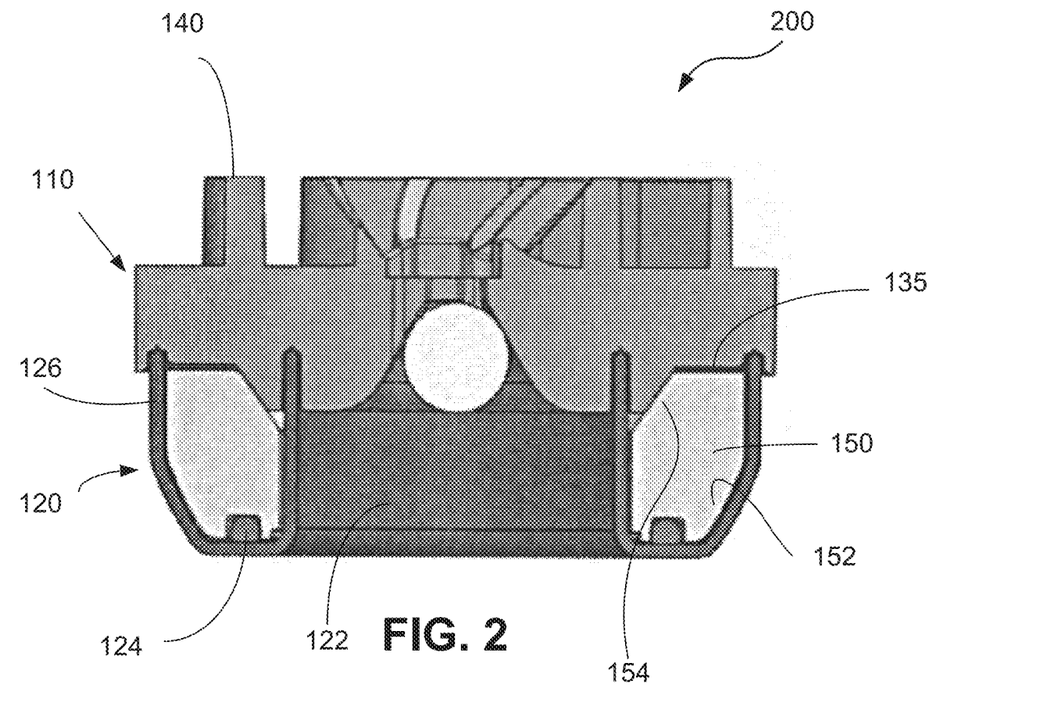
FIG. 2 shows a cross-sectional view of the rotatable impeller assembly of FIG. 1A taken along the line A-A indicated in FIG. 1B.

FIG. 2 shows a cross-section 200 of the impeller assembly 100, taken along the line A-A in FIG. 1B. As mentioned, the impeller assembly comprises an impeller 110 coupled to a rotor 120. As can be seen in more detail in FIG. 2, the rotor 120 comprises a magnetic ring 150 seated in a rotor cup 126. The rotor cup 126 comprises a hollow central void 122 in which a ball bearing sits during rotation of the impeller assembly 100. The magnetic ring comprises a first contact surface 152 that is configured to mate with the inner surface of the rotor cup 126. By mate what is meant is that the first contact surface 152 aligns parallel with the inner surface of the rotor cup 126. As shown in FIG. 2, the first contact surface 152 comprises a tapered or sloped surface that aligns with the geometry of the inner surface of the rotor cup 126. The magnetic ring 150 also comprises a second contact surface 154 that is configured to mate with the rotor contacting surface 135 of the impeller 110. As with the first contact surface 152, the second contact surface 154 may be tapered or sloped and aligns with the rotor contacting surface 135 of the impeller 110.

As can be seen the various sloped angles of the rotor contacting surface 135, first contact surface 152 and second contact surface 154 of the magnetic ring 150, and the inner surface of the rotor cup 126 ensure that the magnetic ring 150 is held in a fixed position when the impeller 110 and the rotor cup 120 sandwich the magnetic ring 150. In some embodiments, the inner surface of the rotor cup 126 may be provided with a ridge 124 that mates with a corresponding groove in the first contact surface 152 of the magnetic ring 150. In some embodiments, this ridge 124 may be implemented as an O-ring. In such embodiments, when the impeller 110 is brought into contact with the rotor 120, the orientation of the first contact surface 152 and second contact surface 154 of the magnetic ring 150, the rotor contacting surface 135, and the groove 124 lock the position of the magnetic ring 150 thereby preventing the magnetic ring from independently rotating within the assembly. Such locking of the magnetic ring 150 ensure that the impeller assembly is balanced during operation (in a pump, for example). In some embodiments the impeller 110 and the rotor cup 126 may comprise polyphenylene sulfide (PPS). Once the impeller 110, the rotor 120 and the magnetic ring 150 are in place as shown in FIG. 2, the assembly is subject to spin welding or ultrasonic welding to form a hermetic seal between the impeller 110 and the rotor 120 with the magnetic ring 150 encapsulated therebetween, thus protecting the magnetic ring 150 from caustic environments in which the impeller assembly 100 is made to operate.

Figure 3:
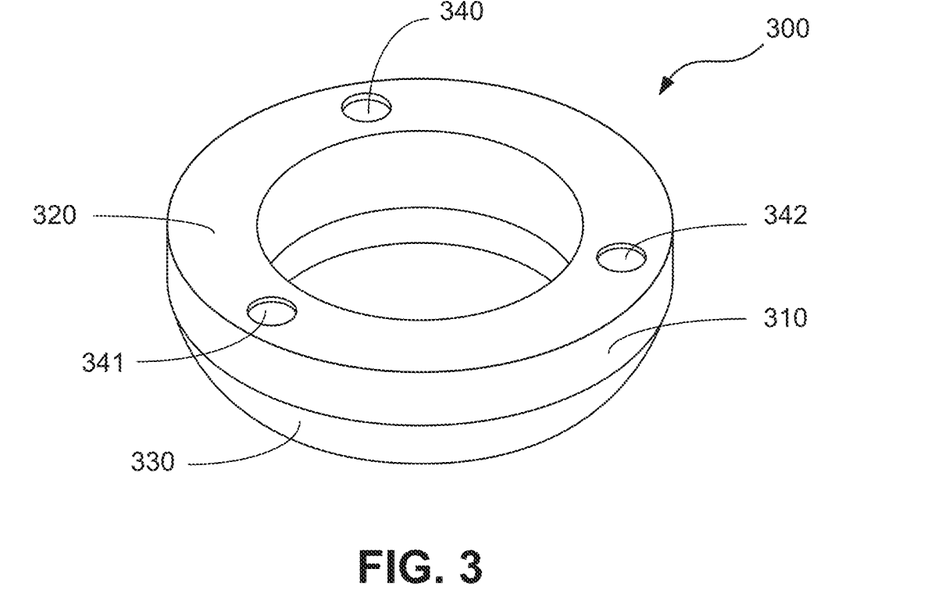
FIG. 3 shows an illustrative magnetic ring of the rotatable impeller assembly of FIG. 1A, according to an embodiment of the present disclosure.

FIG. 3 shows an exemplary magnetic ring 300 similar to ring 150 shown in FIG. 2. Magnetic ring 300 is formed by injection molding a slurry of plastic and magnetic material.

In some embodiments, the magnetic material comprises neodymium. As can be seen in FIG. 2, the magnetic ring body 310 comprises a structure and geometry that complements that of the inner surface of the rotor cup 126 and the rotor contacting surface 135 of the impeller 110. Here the top surface 320 of the magnetic ring 300 mates with the rotor contacting surface 135 of the impeller 110 (tapered surfaces not shown). Similarly the bottom surface 330 of the magnetic ring 300 mates with the inner surface of the rotor cup 126. Additionally, as shown in FIG. 3, as an alternative to tapered surfaces shown in FIG. 2, anti-rotation features 340-342 may be formed on the top surface 320 of the magnetic ring 300. Such features 340-342 may include dimples or etched depressions on the top surface 320 of the magnetic ring 300. These anti-rotation features 340-342 may be coupled with corresponding features formed on the rotor contacting surface 135 of the impeller 110. Such coupling ensures that when the impeller assembly rotates, the magnetic ring 300 is held in a fixed position within the assembly without independently rotating. Minimizing such rotation ensures that the impeller assembly is balanced during operation.

Figure 4:
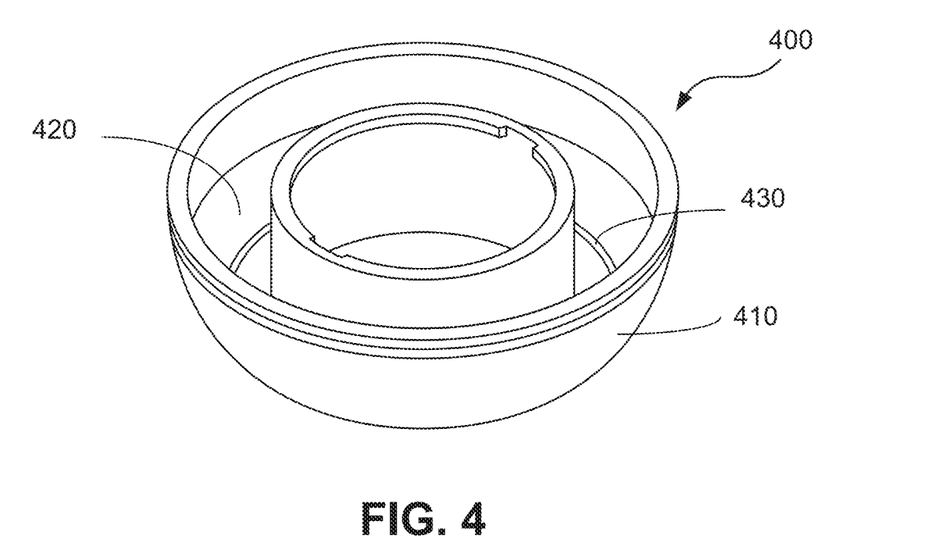
FIG. 4 shows an illustrative rotor cup of the rotatable impeller assembly of FIG. 1A, according to an embodiment of the present disclosure.

FIG. 4 shows an exemplary rotor cup 400 similar to cup 126 shown in FIG. 2. The rotor cup 400 comprises a cup body 410 having an inner surface 420. As mentioned in relation to FIG. 2, the inner surface of the rotor cup 420 has a geometry (slope and taper) that matches that of the first contact surface 152 of the magnetic ring 150. In some embodiments, the inner surface 420 of the rotor cup 400 may comprise a ridge 430 (such as an O-ring, for example) which locks the position of the magnetic ring when seated in the rotor cup 400.

Figure 5:
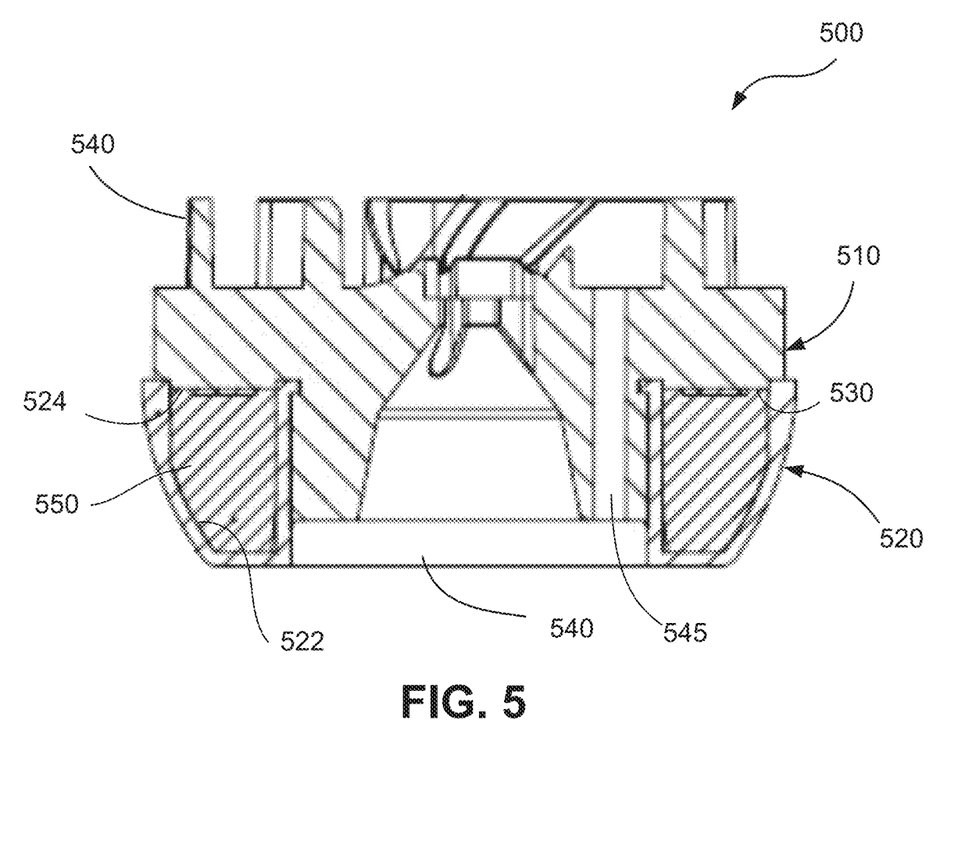
FIG. 5 shows an illustrative overmolded rotatable impeller assembly for pumping caustic fluids in a medical device, according to an embodiment of the present disclosure.

FIG. 5 shows a cross-section of a further exemplary embodiment an impeller assembly 500 according to the present disclosure. The impeller assembly 500 comprises an impeller 510 coupled to a rotor 520. A magnetic ring 550 is seated within the rotor 520, as has been described in relation to FIG. 2. The rotor 520 comprises a hollow central void 540 in which a ball bearing sits during rotation of the impeller assembly 500. The impeller assembly 500 may also comprise holes 545 that extend straight through the assembly 500 for additional stability and balance during rotation. In FIG. 5, the impeller 510 is formed by overmolding a polymer material, such as PPS (for example), over the rotor 520 and magnetic ring 550. Such overmolding enables the rotor contacting surface 530 of the impeller 510 to conform to the features of the magnetic ring 550. Such features may include the anti-rotation features 340-342 in FIG. 3. Impeller blades 540 are formed on the fluid contacting surface of the impeller 510. Overmolding the impeller 510 also forms a hermetic seal with the rotor cup 520 thereby sealing the magnetic ring 550 within the impeller assembly 500. Such a hermetic seal ensures that the magnetic ring 550 is isolated from any caustic environment to which the impeller assembly 500 is exposed.

Figure 6:
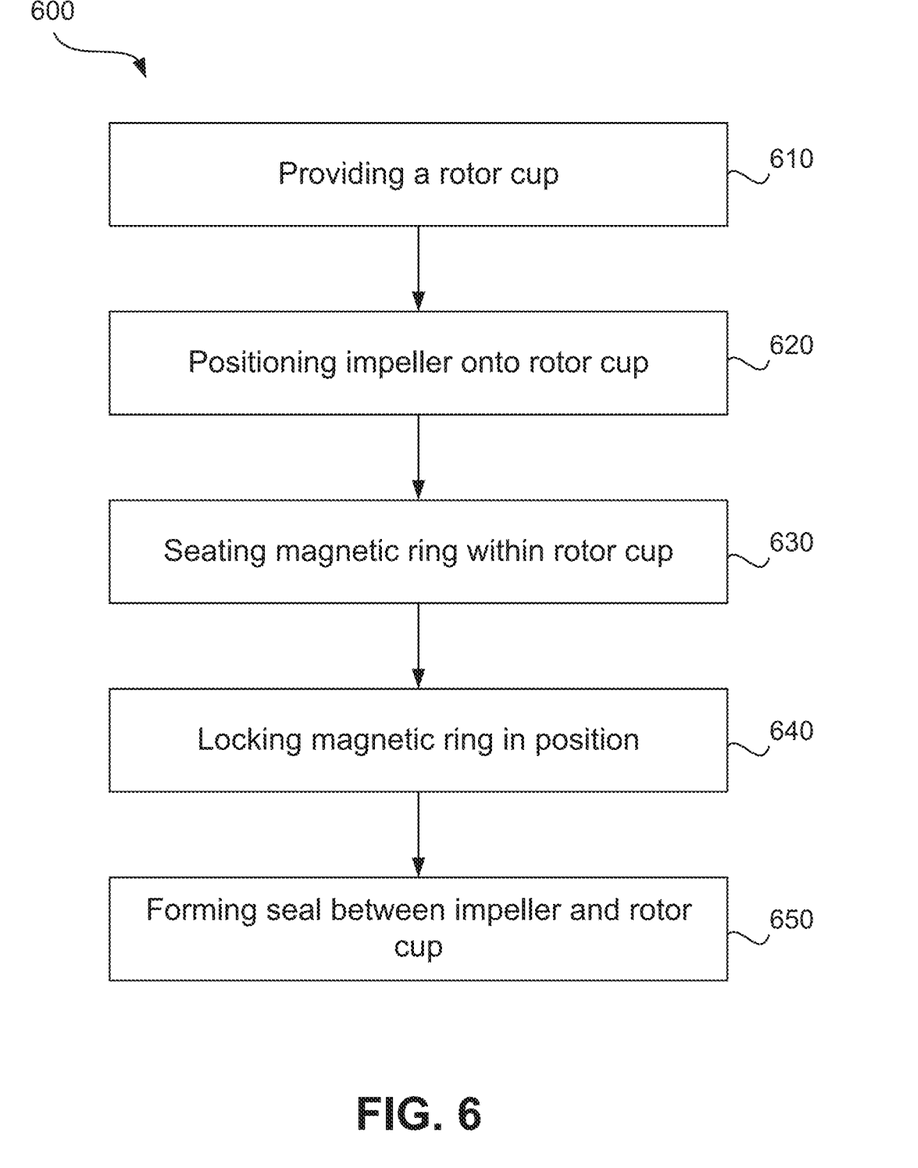
FIG. 6 an illustrative flowchart of a method of manufacturing a rotatable impeller assembly according to an embodiment of the present disclosure.

FIG. 6 illustrates an exemplary method 600 of manufacturing an impeller assembly, such as any of the impeller assemblies, and internal components thereof, as described in the foregoing description, according to an embodiment of the present disclosure. The method 600 begins at step 610 in which a rotor cup is provided. Exemplary rotor cups 126, 400 and 520 have been described in the foregoing in relation to FIGS. 2, 4 and 5. A magnetic ring is then provided within the rotor cup after which an impeller is positioned onto the rotor cup containing the magnetic ring (step 620). Exemplary magnetic rings 150, 300 and 550 have been described in the foregoing in relation to FIGS. 2, 3 and 5. Next, in step 630, once the impeller is positioned, the assembly is compressed so as to fixedly seat the magnetic ring within the assembly structure. Features such as the O-ring and tapered surfaces that have been described in the foregoing facilitate such fixed arrangement of the magnetic ring. Once seated, the magnetic ring is locked in place within the impeller assembly and is prevented from independently rotating within the rotor cup (step 640). In step 650, a hermetic seal is formed between the impeller and the rotor so as to encapsulate the magnetic ring within the impeller assembly. Such a hermetic seal may be achieved by spin welding or ultrasonic welding. For embodiments in which the impeller is overmolded onto the rotor, the hermetic seal is automatically formed with the overmolding process.

The foregoing is merely illustrative of the principles of the disclosure, and the apparatuses can be practiced by other than the described implementations, which are presented for purposes of illustration and not of limitation. It is to be understood that the apparatuses disclosed herein, while shown for use in high flow therapy systems, may be applied to systems to be used in other ventilation circuits.

Variations and modifications will occur to those of skill in the art after reviewing this disclosure. The disclosed features may be implemented, in any combination and subcombination (including multiple dependent combinations and sub-combinations), with one or more other features described herein. The various features described or illustrated above, including any components thereof, may be combined or integrated in other systems. Moreover, certain features may be omitted or not implemented.

Examples of changes, substitutions, and alterations are ascertainable by one skilled in the art and could be made without departing from the scope of the information disclosed herein. All references cited herein are incorporated by reference in their entirety and made part of this application.

The invention claimed is:
1. A medical device comprising:
a respiratory therapy device configured for Assist/Control Ventilation, Intermittent Mandatory Ventilation, Pressure Support Ventilation, Continuous Positive Airway Pressure (CPAP) treatment, Non-Invasive Positive Pressure Ventilation (NIPPV), or Variable Positive Airway Pressure (VPAP) and to deliver high velocity respiratory fluid to a patient, the respiratory device comprising:
rotatable impeller assembly for pumping caustic fluid byproducts in a medical device, the impeller assembly having a central axis, comprising:
a rotor comprising a rotor cup;
an impeller having a rotor contacting surface and impeller blades, wherein the impeller comprises holes that extend through the impeller assembly;
a single-piece magnetic ring seated within the rotor cup, the magnetic ring comprising a first contact surface that is configured to mate with an inner surface of the rotor cup, and a second contact surface that is configured to mate with the rotor contacting surface of the impeller, the magnetic ring thereby being locked in position by the inner surface of the rotor cup and the rotor contacting surface of the impeller so as to prevent any independent rotation of the magnetic ring relative to the rotor cup and the impeller while automatically balancing the rotor,
the inner surface of the rotor cup comprising a continuous ridge comprising an O-ring that mates with a corresponding groove formed in the first contact surface of the magnetic ring, thereby locking the magnetic ring in a fixed position relative to the rotor cup;

wherein the rotor contacting surface of the impeller is attached to the rotor cup to hermetically seal the magnetic ring within the impeller assembly; and a single ball bearing in line with the central axis, supporting the impeller.

2. The medical device of claim 1, wherein the magnetic ring comprises anti-rotation features to prevent the independent rotation of the magnetic ring relative to the rotor cup and the impeller.

3. The medical device of claim 1, wherein the rotor contacting surface of the impeller comprises a tapered surface having at least one angle that complements at least one angle formed on the second contact surface of the magnetic ring, thereby locking the magnetic ring in a fixed position relative to the impeller.

4. The medical device of claim 3, wherein the impeller assembly is automatically centered and balanced once the magnetic ring is locked in a fixed position.

5. The medical device of claim 1, wherein the hermetic seal locks the rotor, magnetic ring and impeller in position within the impeller assembly to prevent any independent rotation.

6. The medical device of claim 1, wherein the magnetic ring is formed by injection molding a slurry of plastic and magnetic material.

7. The medical device of claim 6, wherein the rotor contacting surface of the impeller is attached to the rotor cup by spin welding or ultrasonic welding.

8. The medical device of claim 7, wherein the impeller is formed by overmolding a polymer material onto the rotor cup with the magnetic ring seated therein, the overmolding hermetically sealing the magnetic ring between the rotor cup and the impeller.

9. The medical device of claim 1, wherein the impeller assembly is supported solely by the ball bearing.

10. The medical device of claim 1, wherein the respiratory therapy device comprises a device for low flow oxygen therapy, mechanical ventilation, an oxygen mask, a Venturi mask, or tracheostomy mask.

11. A method of manufacturing a medical device, comprising:

manufacturing an impeller assembly for pumping caustic fluid byproducts in a medical device, the impeller assembly having a central axis and comprising a rotor and an impeller, the method comprising:

providing a rotor cup;

forming a continuous ridge comprising an O-ring in the rotor cup;

positioning an impeller onto the rotor cup, the impeller having a rotor contacting surface and impeller blades, wherein the impeller comprises holes that extend through the impeller assembly;

seating a single-piece magnetic ring within the rotor cup, the magnetic ring comprising a first contact surface that is configured to mate with an inner surface of the rotor cup, a second contact surface that is configured to mate with the rotor contacting surface of the impeller, and a groove formed in the first contact surface and configured to mate with the O-ring so as to lock the magnetic ring in a fixed position relative to the rotor cup;

locking the magnetic ring between the inner surface of the rotor cup and the rotor contacting surface of the impeller so as to prevent any independent rotation of the magnetic ring relative to the rotor cup and the impeller while automatically balancing the rotor;

forming a seal between the impeller and the rotor cup thereby sealing the magnetic ring within the impeller assembly;

mounting the impeller assembly on a single ball bearing in line with the central axis; and mounting the impeller assembly on a medical device comprising a respiratory therapy device configured to deliver high velocity respiratory fluid to a patient.

12. The method of claim 11, comprising:

forming anti-rotation features on the magnetic ring to prevent the independent rotation of the magnetic ring relative to the rotor cup and the impeller.

13. The method of claim 11, comprising:

forming a tapered surface on the rotor contacting surface of the impeller, the tapered surface having at least one angle that complements at least one angle formed on the second contact surface of the magnetic ring, thereby locking the magnetic ring in a fixed position relative to the impeller.

14. The method of claim 11, comprising:

forming the magnetic ring by injection molding a slurry of plastic and magnetic material.

15. The method of claim 14, comprising:

attaching the rotor contacting surface of the impeller to the rotor cup by spin welding or ultrasonic welding.

16. The method of claim 15, comprising:

forming the impeller by overmolding a polymer material onto the rotor cup with the magnetic ring seated therein, the overmolding hermetically sealing the magnetic ring between the rotor cup and the impeller.

* * * * *